United States Patent [19]
Downey

[11] Patent Number: 6,043,635
[45] Date of Patent: *Mar. 28, 2000

[54] SWITCHED LEG POWER SUPPLY

[75] Inventor: Walter J. Downey, Los Gatos, Calif.

[73] Assignee: Echelon Corporation, Palo Alto, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/649,574

[22] Filed: May 17, 1996

[51] Int. Cl.$^7$ .............................. G05F 1/40; H02M 7/00
[52] U.S. Cl. ........................................... 323/282; 363/124
[58] Field of Search ............................ 363/89, 124, 125, 363/84; 323/908, 282

[56] References Cited

U.S. PATENT DOCUMENTS

| | | | |
|---|---|---|---|
| Re. 29,048 | 11/1976 | Brown | 323/22 |
| 4,359,681 | 11/1982 | Baker et al. | 323/320 |
| 4,559,594 | 12/1985 | Sears et al. | 363/21 |
| 4,713,598 | 12/1987 | Smith | 323/245 |
| 4,821,166 | 4/1989 | Albach | 363/89 |
| 4,874,962 | 10/1989 | Hermans | 307/116 |
| 4,918,690 | 4/1990 | Markkula et al. | 370/400 |
| 4,962,354 | 10/1990 | Visser et al. | 323/360 |
| 5,018,138 | 5/1991 | Twitty et al. | 370/448 |
| 5,124,566 | 6/1992 | Hu | 307/116 |
| 5,182,746 | 1/1993 | Hurlbut et al. | 370/463 |
| 5,347,549 | 9/1994 | Baumann et al. | 375/369 |
| 5,454,008 | 9/1995 | Baumann et al. | 375/369 |
| 5,457,595 | 10/1995 | Baldwin | 307/117 |
| 5,548,614 | 8/1996 | Stoll et al. | 375/211 |
| 5,600,552 | 2/1997 | McCavit et al. | 363/89 |
| 5,623,172 | 4/1997 | Zaretsky | 307/117 |
| 5,701,240 | 12/1997 | Downey et al. | 363/35 |
| 5,703,766 | 12/1997 | Sutterlin et al. | 363/35 |
| 5,742,105 | 4/1998 | Lech | 307/125 |

*Primary Examiner*—Peter S. Wong
*Assistant Examiner*—Bao Q. Vu
*Attorney, Agent, or Firm*—Blakely, Sokoloff, Taylor & Zafman, LLP

[57] ABSTRACT

A power supply for operating from a switched leg of an AC power line is described. A switch provides current during the beginning of each AC half cycle to an inductor and charges a capacitor. When the switch is open, the inductor continues to charge the capacitor. During the time that the inductor is coupled to that AC line, the switched leg is open. For instance, the signal used to close the switch also prevents a triac in the switched leg from conducting.

9 Claims, 3 Drawing Sheets

SWITCHED LEG POWER SUPPLY

RELATED APPLICATIONS

This application is related to co-pending continuation-in-part application Ser. No. 08/649,163, filed May 17, 1996, entitled "Apparatus for Powering a Transmitter from a Switched Leg", and assigned to the Assignee of the present application.

BACKGROUND OF THE INVENTION

1. Field of the Invention

The invention relates to the field of power supplies, particularly power supplies operated from alternating current switched legs.

2. Prior art.

Often in circuits designed to deliver power to, for instance, an incandescent light bulb, a single pole switch is used to complete or interrupt a circuit. Generally, the switch is located remotely from the light bulb with only one of the "hot" power line or neutral line routed to the switch. That is, the switch is mounted apart from a point where both the neutral line and the "hot" line are available without the bulb in one of the lines. This arrangement is referred to as a switched leg. This switched leg is typically adequate except where it is necessary to provide power at the switch itself. When power is required at the switch, current must be drawn through the light bulb to obtain this power. If the switch is in the off position, the current drawn through the bulb may cause the bulb to appear be lighted especially where the bulb is in a dark background.

A circuit for providing power in a switched leg is described in U.S. Pat. No. 4,713,598.

SUMMARY OF THE INVENTION

A power supply for use in a switched leg power line circuit which includes a first switch for controlling current to a lamp or other load is described. An inductor is coupled to a capacitor where the capacitor provides the output power. A second switch selectively couples the inductor to the power line. A control circuit controls the second switch and periodically closes it such that the inductor receives current from the power line. The control circuit also assures that the first switch remains open when the second switch is closed.

Other aspects of the invention will be apparent from the following detailed description.

A filter circuit is put in series with the first switch which provides a very low impedance at line frequency, but presents a high impedance at a band of frequencies used for communication over the power lines.

DETAILED DESCRIPTION OF THE PRESENT INVENTION

A power supply for operating from a switched leg is described. In the following description numerous specific details are set forth such as an electrical schematic with specific components. It will be apparent to one skilled in the art, however, that the present invention may be practiced without these specific details. In other instances, well-known circuits such as flip-flops are not discussed in detail in order not to obscure the present invention.

Overview of the Present Invention

Figure 1:
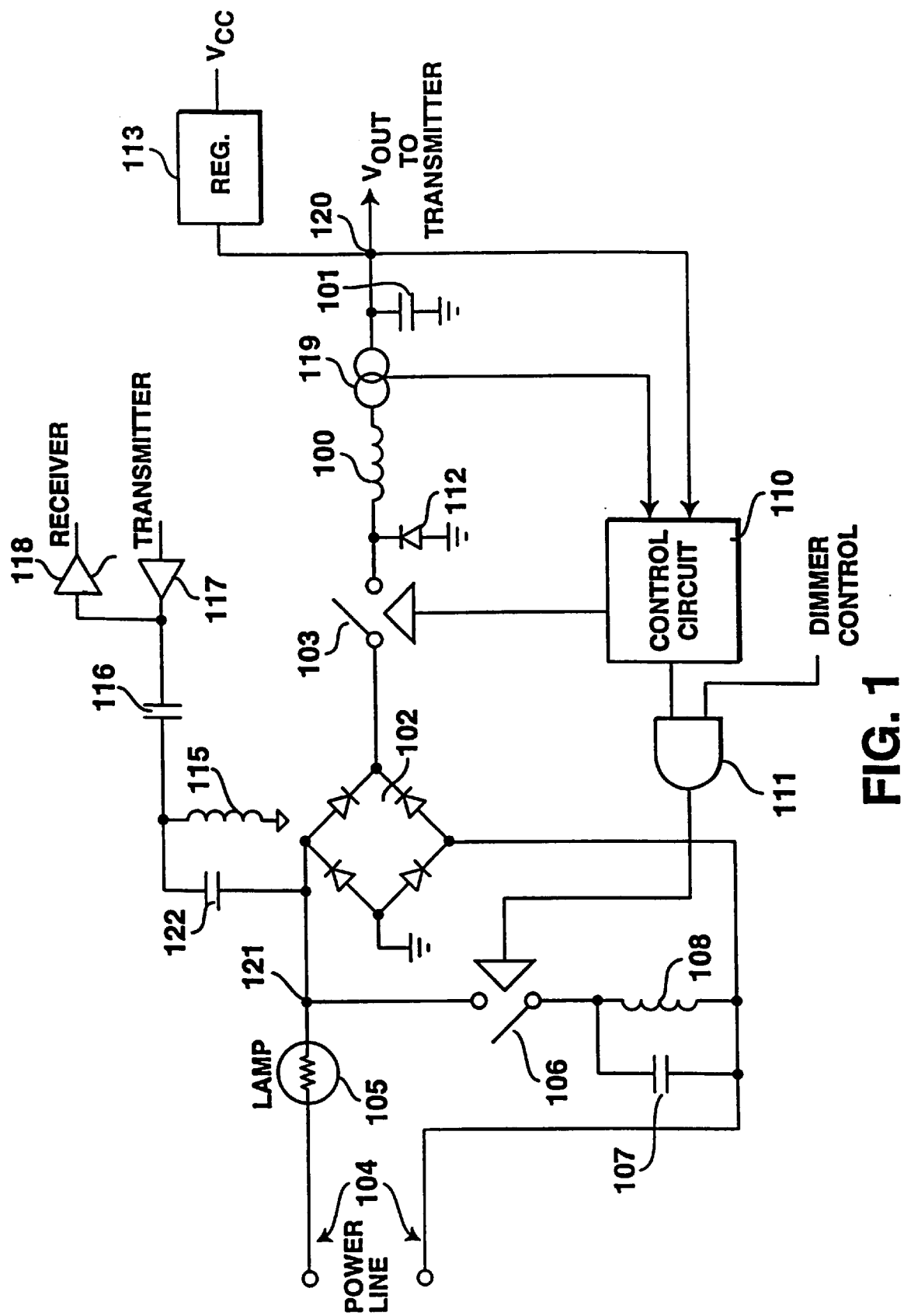
FIG. 1 is a block diagram/schematic illustrating the power supply of the present invention.

Referring first to FIG. 1, a power line 104 is shown which, in most applications, is an alternating current power line having a "hot" line and a neutral line. Most often in the United States this is 110V, 60 Hz power line. An incandescent lamp 105 (or other load) is connected to the power line through a switch shown as a triac 106. The triac 106 is coupled to the neutral power line through an inductor 108.

The problem which arises is when power is needed at node 121. This power, as mentioned, may be required in the junction box which includes a switch or dimmer to, for example, power an intelligent cell which controls the triac 106 and which communicates over the power line 104. Such cells are disclosed in, for example, U.S. Pat. No. 4,918,690. As can be readily seen from FIG. 1, if too much current is drawn at node 121 when the triac 106 is not conducting, the lamp 105 may have a noticeable glow, especially in the dark. When the triac 106 is conducting, node 121 is substantially at neutral (or ground) making it difficult to obtain power from the node without transformer coupling and making it difficult to transmit from transmitter 117 onto the power line or receive from receiver 118 communication signals present on the power line.

When the lamp 105 is on, its resistance is relatively high, particularly when compared to the power line impedance. Consequently, the transmission of a signal from the transmitter 117 over the power line is made more difficult. An additional problem is that transmission from the transmitter 117 must occur not only when the lamp is on but also when the lamp is off (making its impedance relatively low). Thus there is an impedance matching problem.

With the present invention the AC potential from node 121 is rectified by a diode bridge 102. The output of the bridge 102 is coupled through a switch 103 to an inductor 100. The inductor is coupled to the node 120 through a current shunt 119. Charge is stored at node 120 on the capacitor 101 which is coupled between node 120 and circuit ground.

The voltage regulator 113 is powered from node 120 and is used, for example, to power the cell. As is apparent from FIG. 1, when switch 103 is closed, a positive potential is applied to the capacitor 101 through the inductor 100. At the beginning of each AC half cycle (shown as area 165 of the waveform 161 of FIG. 3) a current is induced in the inductor 100 and the inductor 100 thereby stores energy while the capacitor 101 is charged. When the switch 103 is opened current flows through the diode 112 and inductor 100 continuing charging of the capacitor 101.

The control circuit 110 senses the current in the inductor 100 through the shunt 119 and also senses the voltage on the capacitor 101. The control circuit 110 closes the switch 103 at the beginning of each AC cycle and then opens the switch 103 when either the current in the inductor reaches a predetermined level or when the voltage on capacitor 101 reaches a predetermined voltage.

The control circuit 110 also provides an output signal to the AND gate 111. The other terminal of AND gate 111 receives a dimmer control signal. This signal controls the intensity of the light from lamp 105 by controlling when the triac 106 begins conducting in each AC half cycle as is well known in the art. The dimmer control signal may be developed from a manual control or may be provided from the intelligent cell discussed above. For purposes below it is assumed that whenever a positive potential is present on the dimmer control line, the triac 106 will conduct. However, if a zero potential is applied to the AND gate 111 from the control circuit 110 the triac 106 will not conduct. With the present invention, when the switch 103 is closed, the control circuit 110 assures that the triac 106 is not conducting by providing a zero signal to the gate 111.

During the beginning of each AC half cycle, the lamp 105 is kept off for a very short period of time and during this time energy is stored in the inductor 100 while the capacitor is partly charged. This energy is used to continue to charge capacitor 101 after the inductor is uncoupled from the power line.

Figure 2:
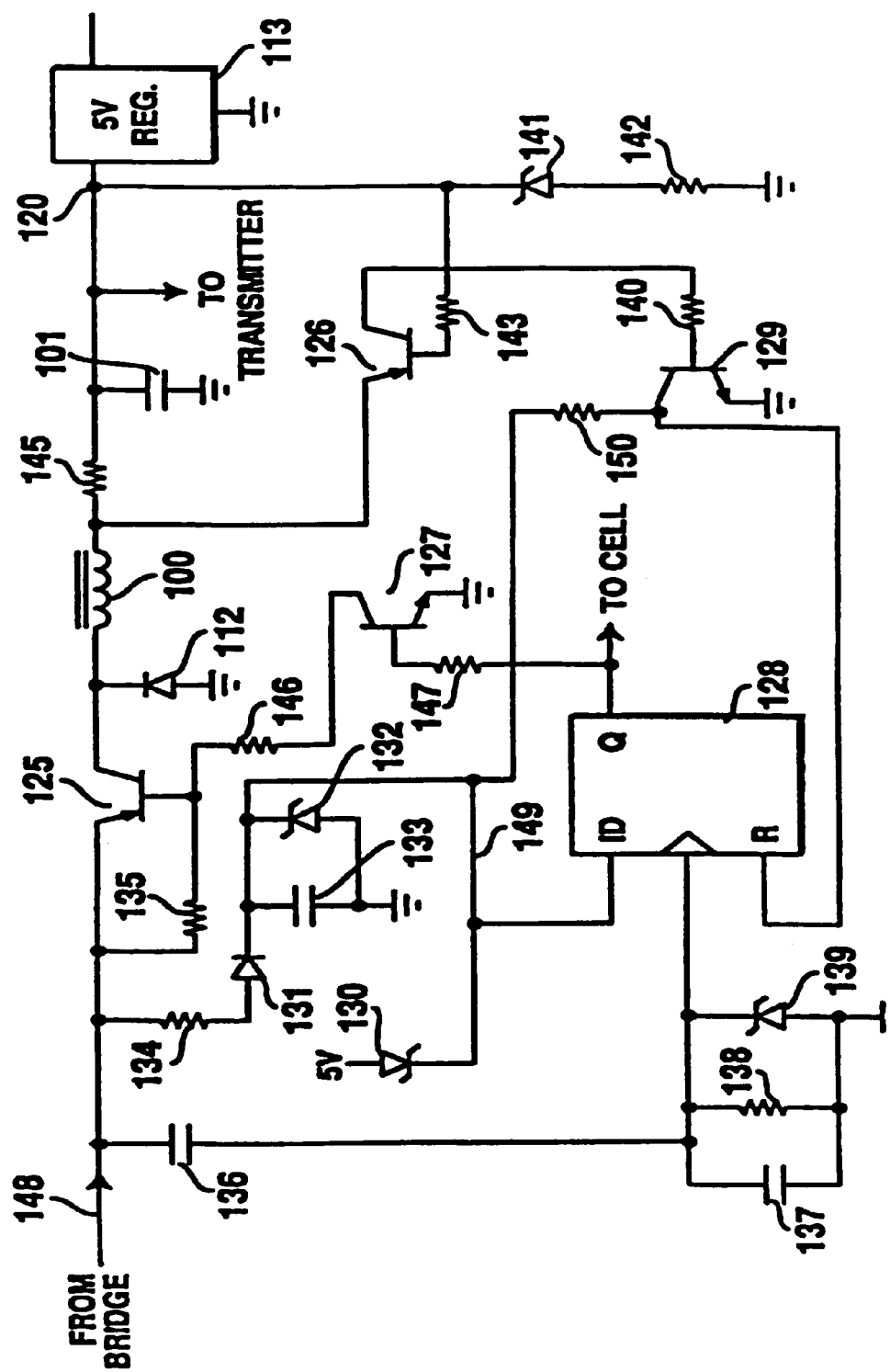
FIG. 2 is an electrical schematic of one embodiment of the present invention.

Electrical Schematic of FIG. 2

In FIG. 2 the node 148 is coupled to a rectifying bridge, such as the bridge 102 of FIG. 1. Node 148 is coupled to the emitter terminal of a pnp transistor 125. This transistor performs the function of the switch 103 of FIG. 1 by selectively switching current between its emitter and collector. The inductor 100, capacitor 101 and diode 112 of FIG. 1 are again shown in FIG. 2. The node 120 provides power directly to the transmitter in one embodiment and also to the regulator 113.

The control circuit 110 of FIG. 1 is realized in FIG. 2 as a flip-flop 128. The Q output of the flip-flop 128 provides the signal for controlling the transistor 125. More specifically, this terminal is coupled to the base of the npn transistor 127 through a resistor 147. The base of transistor 125 is coupled through the resistor 146 to the collector of transistor 127. The emitter of transistor 127 is coupled to ground. The base of the transistor 125 is also coupled to the emitter of this transistor through the resistor 135. As is apparent, when the Q terminal of the flip-flop 128 is high, transistor 127 conducts thereby causing transistor 125 to conduct. This couples the inductor 100 to the power line.

Current is sensed through the inductor 100 by noting the voltage drop across the resistor 145. This resistor is coupled to the emitter of the pnp transistor 126. The base of this transistor is coupled to node 120 through the resistor 143. The collector of this transistor is coupled to the base of an npn transistor 129 through a resistor 140. The potential on the collector on the transistor 129 is coupled to the reset terminal of the flip-flop 128. Current through resistor 145, as sensed by transistor 126, causes transistor 129 to conduct thereby providing a reset signal to flip-flop 128. When the current in the inductor 100 reaches approximately 0.45 amps in the embodiment of FIG. 2, reset occurs. Also, the voltage on the node 120 is sensed by transistor 129 through the zener diode 141 and resistor 142. Zener diode 141 is coupled to the base of transistor 129 through resistor 140. In the embodiment of FIG. 1, when the voltage on capacitor 101 exceeds 15.7 volts transistor 129 conducts and a reset signal is transmitted to the flip-flop 128. Thus, either the current of 0.45 amps in the inductor 100 or the voltage of 15.7 volts on node 120 will reset the flip-flop 128.

Power is provided for the circuit of FIG. 2 initially from node 148 through the resistor 134 and diode 131. Zener diode 132 clamps node 149 to approximately 5V which is stored on capacitor 133. Subsequently, power is obtained from the regulator 113 through the diode 130 which provides regulated power to node 149 once capacitor 101 is charged.

Node 149 is coupled to the flip-flop 128 and to the collector of transistor 129 through resistor 150.

The rectified AC signal from node 148 is coupled through the capacitor 136 and resistor 151 to the parallel combination of capacitor 137, resistor 138 and the zener diode 139. These components provide a zero crossing detector with an output shown on line 162 of FIG. 3 to the clock terminal of the flip-flop 128. Each time there is a zero crossing of the potential on the power line, there is a rising edge provided to the flip-flop 128.

Figure 3:
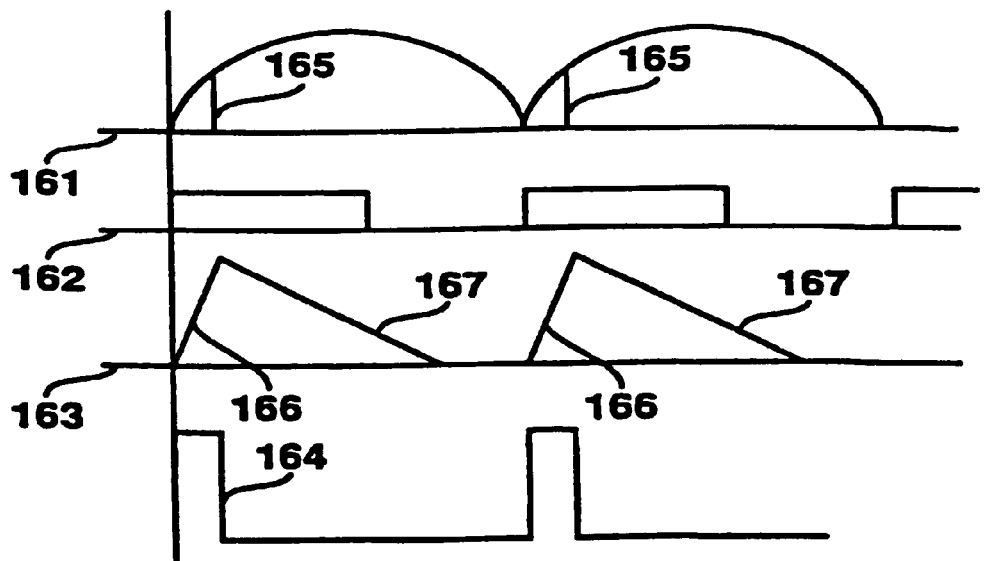
FIG. 3 illustrates a plurality of waveforms used to describe the operation of the circuit of FIGS. 1 and 2.

Referring to FIG. 3, the potential on the node 148 is shown as a rectified signal, waveform 161. On the rising edge of the clock signal (waveform 162) the flip-flop is set high because the potential on the D terminal of the flip-flop 128 is high. This causes the Q output of the flip-flop to be high and as mentioned, closes the switch provided by transistor 125. For a short period of time thereafter, shown by the area 165 in FIG. 3, the current in the inductor 100 (FIG. 2) builds up. The current builds up relatively quickly as shown by the steep leading edges 166 of the waveform 163. When the current in the inductor 100 reaches a predetermined level (0.45 amps for the embodiment under discussion) or when the potential on node 120 reaches 15.7 volts, transistor 129 conducts and the 0 volts from the collector of transistor 129 is transmitted to the reset terminal of the flip-flop 128. This causes the flip-flop 128 to reset thereby dropping the potential at the output of a flip-flop (see pulse 164 of FIG. 3 representing the output of the flip-flop 128). This in turn causes the transistor 125 to cease conducting.

The transistor 125 remains off until the next half cycle when the clock signal transitions from low to high (waveform 162) which causes the flip-flop 128 to be set with its output high. During the time that transistor 125 is not conducting, the energy stored in the inductor 100 charges capacitor 101, this is shown by the slope 167 of the waveform 163. In a typical application, the time defining the area 165 is approximately 0.5 msecs of the complete half cycle of approximately 8.3 msecs. Thus, even though during this period of approximately 0.5 msecs current is prevented from flowing through the switched leg, it is a relatively short period and represents only a fraction of the total power that can be delivered to the bulb.

In FIG. 2 the AND gate 111 of FIG. 1 is not used but rather, a signal from the output of the flip-flop 128 is sent to the intelligent cell and the cell prevents a dimmer control signal from activating the triac 106 of FIG. 1 when transistor 125 is conducting.

Specific Components Used in the Embodiment of FIG. 2

The following represents the specific values and parts used in the embodiment of FIG. 2.

| Resistors | Value (ohms) |
| --- | --- |
| 134 | 100K |
| 135 | 1K |
| 138 | 50K |
| 140 | 1K |
| 142 | 1K |
| 143 | 1K |
| 145 | 1.5 |
| 146 | 2.5K |
| 147 | 5K |

-continued

| | |
|---|---|
| 150 | 100K |
| 151 | 100K |
| Capacitors | Value (μF) |
| 101 | 3300 |
| 133 | 0.1 |
| 136 | .01 |
| 137 | .01 |
| Inductor | Value |
| 100 | 270 mH |
| Diodes | Part No./Voltage |
| 112 | 1N4004 |
| 130 | 1N4148 |
| 131 | 1N4148 |
| 132 | 5.1 V |
| 139 | 5.1 V |
| 141 | 15 V |
| Transistors | Part No. |
| 125 | FZT796 |
| 126 | 2N3906 |
| 129 | 2N3904 |
| 127 | MPSA42 |

Data Transmission onto the Power Line through the Switched Leg

In one embodiment, data from the intelligent cell is communicated onto the power line at node 121 from the transmitter 117. By way of example, the data is transmitted at a frequency of approximately 132 kHz. A number of problems arise when transmitting data through the switched leg. One problem is that when the triac 106 is closed there is essentially a path to ground or the neutral from the transmitter 117. Additionally, the resistance of the lamp 105 is typically relatively low when the lamp is off and then rises as current flows through the lamp, and the resistance of the lamp particularly in the on state is relatively high when compared to the impedance of the power line 104. Thus much of the signal intended to be transmitted on the power line may be lost through the lamp.

The inductor 108 and capacitor 107, as can be seen in FIG. 1, are coupled in parallel between the triac 106 and the neutral. These components are selected so that they have substantially no impedance at 60 cycle and infinite impedance at 132 kHz. When the triac 106 is conducting and the transmitter 117 is transmitting, there is in essence an open circuit between node 121 and the neutral of the power line insofar as the 132 kHz signal is concerned.

The change in impedance at the output of the transmitter 117 that occurs when the triac 106 begins conducting can be compensated for in a number of ways. The intelligent cell controls the conducting of the triac 106 and consequently it is known when the impedance will change. Another approach is to use two different output stages in the transmitter 117. For example, if it is known that the bulb when off, has a resistance of 10 ohms and a resistance of 400 ohms when on, the output stages can compensate for this. One shortcoming to this approach is that the lamp resistance will vary depending upon the size of the bulb.

Figure 4:
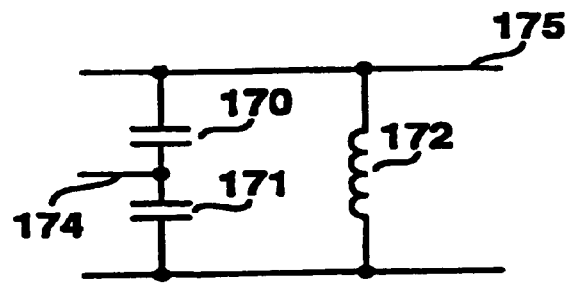
FIG. 4 illustrates alternate coupling for coupling a transmitter to a switched leg.

Passive networks can be used to provide adaptive impedance matching. One simple approach is shown in FIG. 1 using the inductor 115 and the capacitor 116 at the output of the transmitter 117. This simple LC network provides matching when LC is approximately equal to 132 kHz. Changing 116 to an inductor and 115 to a capacitor will also work. Another passive network for performing the same function is shown in FIG. 4. The transmitter is coupled to the line 174. The output signal is transmitted across the inductor 172 through the capacitors 170 and 171. The output 175 is coupled to the node 121 of FIG. 1. Generally, the capacitor 171 has substantially more capacitance than capacitor 170 and thus the network provides a higher output voltage as the resistance on line 175 increases. Changing 170 and 171 to inductors and 172 to a capacitor will also work.

Figure 5:
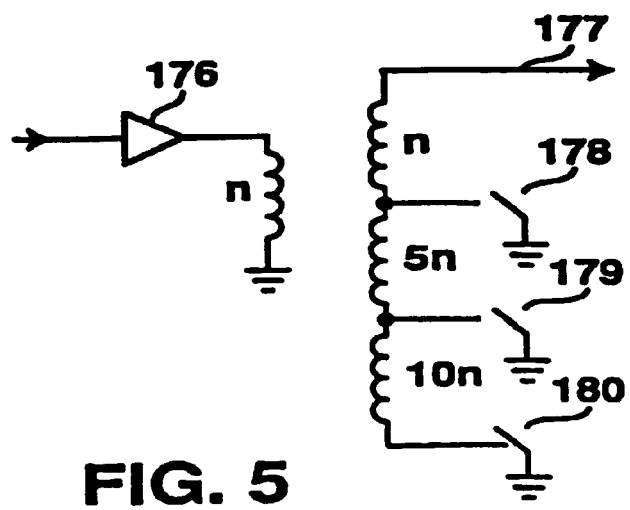
FIG. 5 illustrates yet another coupling for coupling a transmitter to a switched leg.

Another approach to solve this problem is shown in FIG. 5 where the transmitter 176 is coupled to the primary winding of a transformer having n turns. The secondary of the transformer has several selectable windings, specifically, n when switch 178 is closed, 6 n when switch 179 is closed, and 16 n when switch 180 is closed. Thus, the output voltage on line 177 may be controlled by selectively closing the switches 178 through 180. The appropriate switch may be closed as a function of the bulb resistance. Again, since the intelligent cell knows when the triac 106 will conduct part of the information needed for controlling switching is available. The current through the triac may be measured to provide additional information needed to select an appropriate switch.

Another problem is that when switch 106 is opened or closed a large transient followed by ringing in combinations of inductors and capacitors can impair receiver 118 from properly receiving a communication signal. One solution is to use active damping where, for instance, a low value resistance can be momentarily switched in, for example, across capacitor 107 or capacitor 122 to damp ringing.

Thus, a power supply has been described which receives power from a switched leg.

I claim:

1. A power supply which operates from a switched leg and which includes a first switch for controlling the flow of current through the switched leg comprising:
    an inductor;
    a capacitor coupled to the inductor;
    a second switch, coupled in series with the inductor, wherein the second switch, inductor and capacitor are coupled across the first switch such that the inductor receives current from the power line only when the first switch is open and the second switch is closed; and
    a control circuit coupled to the first switch and second switch for periodically switching the second switch and for (i) opening the first switch when the second switch is closed to provide current to the inductor for the condition where the first switch is closed so as to allow current to flow in the switched leg, and (ii) leaving the first switch open when the second switch is closed for the condition where the first switch is not providing current in the switched leg.

2. The power supply defined by claim 1 wherein the inductor receives the current from the power line when the second switch is closed and charges the capacitor when the second switch is opened.

3. The power supply defined by claim 2 wherein the second switch is opened when current in the inductor reaches a predetermined level or when voltage on the capacitor reaches a predetermined voltage.

4. The power supply defined by claim 3 wherein the control circuit comprises a flip-flop.

5. A power supply for coupling to a switched leg of an alternating current AC power line which includes a first switch comprising:
    an inductor;

a capacitor coupled to the inductor;

a second switch coupled in series with the inductor wherein the second switch, inductor and capacitor receive current from the power line only when the first switch is open and the second switch is closed; and a control circuit coupled to the first switch and second switch for closing the second switch at a zero crossing on the power line and for (i) opening the first switch when the second switch is closed to provide current to the inductor for the condition where the first switch is closed so as to allow current to flow in the switched leg, and (ii) leaving the first switch open when the second switch is closed for the condition where the first switch is not providing current in the switched leg.

6. The power supply defined by claim 5 wherein the inductor receives power from the power line when the second switch is closed and continues to charge the capacitor when the second switch is opened.

7. The power supply defined by claim 5 wherein the control circuit causes the second switch to remain closed until voltage on the capacitor reaches a predetermined level.

8. The power supply defined by claim 5 wherein the control circuit causes the second switch to remain closed until current in the inductor reaches a predetermined level.

9. The power supply defined in claim 5, 6, 7 or 8 wherein the control circuit provides a signal inhibiting the first switch from closing so long as the first switch is closed.

* * * * *